Aug. 21, 1951  G. PASTOR  2,565,185
APPARATUS FOR PROJECTING THREE-DIMENSIONAL PHOTOGRAPHS
Filed Jan. 13, 1947

INVENTOR.
GUILLERMO PASTOR
BY

Patented Aug. 21, 1951

2,565,185

UNITED STATES PATENT OFFICE 2,565,185

APPARATUS FOR PROJECTING THREE-DIMENSIONAL PHOTOGRAPHS

Guillermo Pastor, La Paz, Bolivia

Application January 13, 1947, Serial No. 721,689

5 Claims. (Cl. 88—16.6)

This invention relates to an improved method of and apparatus for projecting stereoscopic pictures.

As is well known to those familiar with the subject, it has long been desired to provide a simple and practical method of and apparatus for projecting the images from a suitably exposed standard motion picture film, black and white, or colored, upon a screen with a three-dimensional effect. Such mechanisms heretofore adopted have been relatively expensive and not adaptable to projectors now in use without extensive modification.

The present invention, however, is believed to be of such simple, compact and self-contained construction as to permit its adaptation to projectors now in general use without material modification.

One of the objects of the present invention is to provide an attachment which may be directly associated with any standard make moving picture projector for projecting images from a suitably exposed standard film on to a screen in such a manner as to permit the same to be viewed with stereoscopic or three-dimensional effect through suitable individually worn glasses or the like by each observer.

A further object of the invention is to provide an attachment for projectors which may be inexpensively manufactured and applied without materially changing the structure and operation of the projector.

Still another object is to provide an attachment which will permit the projection of standard black and white or color film in a standard projector upon a screen with a three-dimensional effect when viewed through suitable individually worn glasses.

With these and other objects in view, which may be incident to my improvements, the invention consists in the parts and combinations to be hereinafter set forth and claimed, with the understanding that the several necessary elements, comprising my invention, may be varied in construction, proportions and arrangements, without departing from the spirit and scope of the appended claims.

In order to make my invention more clearly understood, I have shown in the accompanying drawing means for carrying the same into practical effect, without limiting the improvements in their useful applications to the particular constructions, which for the purpose of explanation, have been made the subject of illustration.

Figure 1:
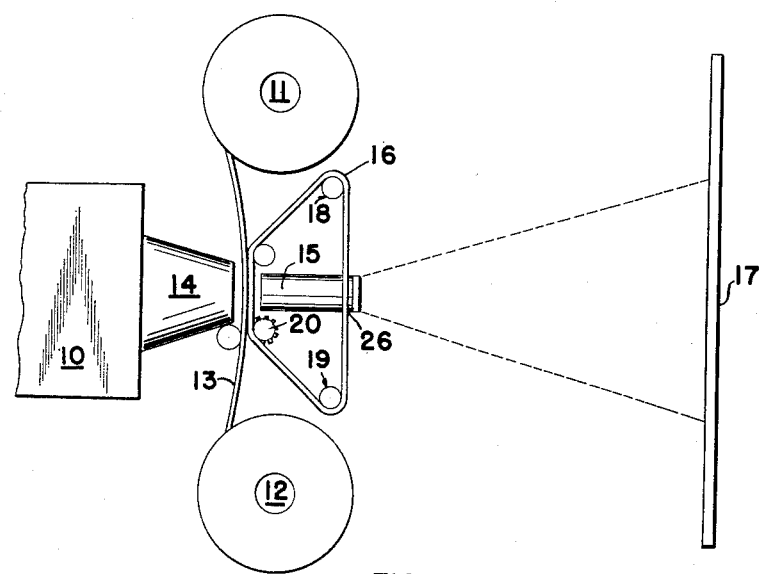
Figure 1 is a semi-diagrammatic plan view illustrating a projector and its standard form of film feeding mechanism, together with the attachment applied thereto.

Referring to the drawings, and more particularly to Fig. 1 in which the essential parts of the projector and pilot film are shown semi-diagrammatically, 10 indicates a standard form of moving picture projector, having upper and lower film reels, 11 and 12 respectively, for driving a previously prepared master film 13 and a pilot film 16, described hereinafter in detail, past the usual condenser 14 and projecting lens 15. The light rays emanating from the projector 10 pass through condenser 14, the master film 13, the pilot film 16, and the projecting lens 15 on to a suitable screen 17.

The master film 13 may be prepared in any of a number of known methods so that right and left stereoscopic frames succeed each other. One satisfactory method, and the method shown here in conjunction with this invention, is to take alternate right and left frames in a moving picture camera so constructed that the images recorded on the master film produce a stereoscopic or three-dimensional effect when projected through a pilot film and view through specially prepared eye glasses. Images of this type may be recorded by a camera similar to the one shown in my previously granted U. S. Patent 2,348,410, wherein each succeeding image is recorded by means of suitable mechanism from a distance apart, equal, or approximate to the distance between human eyes. In the present invention, the master film 13 is exposed by a camera of the type briefly described above or similar thereto. Having a master film 13 so prepared and projecting these images through a special pilot film 16, hereinafter described in detail, on to a non-depolarizing screen will produce a three-dimensional effect when the images on the screen are view through properly constructed glasses.

With the images recorded on the master film 13 alternately right and left, as explained, some means must be employed to block out the alternate pictures relatively from the right eye and then the left, the persistence of vision carrying over these alternate picture impressions as given on the screen 17 to give the desired three-dimensional effect.

I propose blocking alternate right and left images by utilizing a shutter or a pilot film 16 of loop or endless form passing over upper and lower rollers 18 and 19; this film is the same size as the master film 13 and is provided with side feed openings to be engaged by the usual feed gear teeth 20. The pilot film 16, herein shown endless in form, is of a length which will give it sufficient time to cool after passing the condenser's beam and lies adjacent the film 13 as it passes projector lens 15 having its inoperative side slightly to one side of the path of the projected beam, as at 26, so as not to interfere in any way with it. The pilot film 16 is shown placed on the outer side of the master film 13; it is preferably placed on this side of the master film because some types of film contain ingredients which when superimposed on polarizing material tend to change the angle of polarization.

Figures 2, 3, 4:
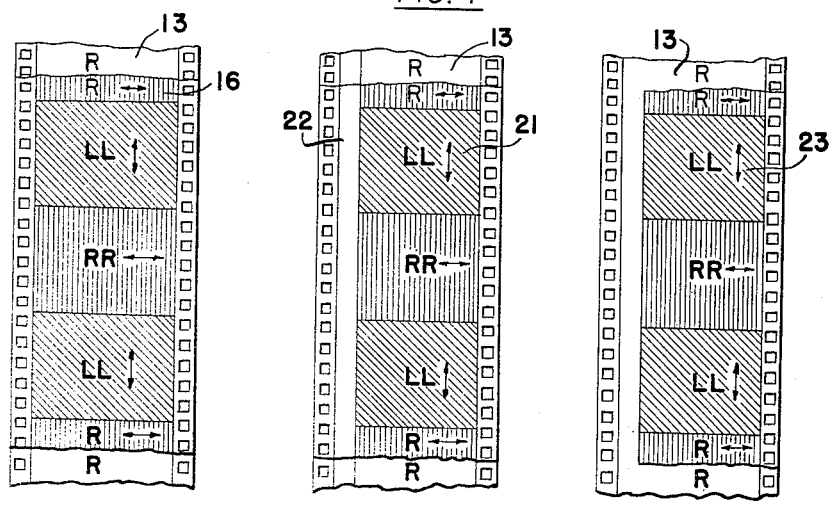
Fig. 2 is a detailed plan view of portions of the main film and a pilot film showing one form of the invention.
Fig. 3 is a detailed plan view of portions of the main film and a pilot film showing another modification of said pilot film.
Fig. 4 is a detailed plan view of portions of the main film and a pilot film showing still another modification of said pilot film.

The alternate frames of the pilot film 16 are treated so as to polarize light alternately in opposite senses, herein shown horizontal and vertical as indicated by the arrows in Figs. 2, 3, and 4. Having a master film 13 comprising alternate frames of images taken first from a position corresponding to the right eye and then from a position corresponding to the left eye, light from the projector passing through the master film 13 and the pilot film 16 and eventually on to the screen 17 is therefore polarized alternately in opposite senses. Each observer has glasses or viewers, not shown, with right and left lenses treated to polarize light in opposite senses; light passing through the right lens of the glasses is polarized in a horizontal sense and through the left in a vertical sense. Consequently, the right eye of the observer can only see those images projected on to the screen which have passed through the frame of the pilot film and the lens of the glasses polarizing light in the same or horizontal sense, while the left can only see those whose light is polarized in a vertical sense by the pilot film; when the right eye is permitted to see the image on the screen, the left eye is blocked due to the fact that the image which the right eye sees is projected by a beam of light polarized in a horizontal sense and the left eye can only see those images projected by a beam of light polarized in a vertical sense. It naturally follows the right eye is blocked from seeing those images the left eye can see for the same reason. With a succession of images appearing on the screen alternately polarized in opposite senses and alternately seen by the right and then the left eye, persistence of vision retains and blends the impressions received by the respective eyes, giving the observer an impression of seeing with both eyes at the same time images as in natural stereoscopic vision.

It may be noted here that while it is preferable to feed this type of film through the projector at a high speed, its third dimensional effect is in no way depreciated by the speed of the standard projectors.

Modifications of the pilot film in Fig. 2 are shown in Figs. 3 and 4. In Fig. 3 the master film 13 and a pilot film 21 are shown superimposed as in Fig. 2. The pilot film 21, however, has a clear strip 22 on one side; the clear strip permits the uninterrupted passage of the beam of light of the sound unit. In Fig. 4 the same effect is accomplished by making the pilot film 23 of a width only up to the sound track of the master film 13. In this modification the beam of light of the sound unit passes directly to the sound track on the master film without passing through a cleared strip of the pilot film as in Fig. 3.

From the above, it will be seen that the present invention provides a simple and inexpensive attachment for projectors of the ordinary standard make, permitting one to project moving pictures in three-dimensions either in black and white or in color.

While I have shown and described the preferred embodiment of my invention, I wish it to be understood that I do not confine myself to the precise details of construction herein set forth, by way of illustration, as it is apparent that many changes and variations may be made therein, by those skilled in the art, without departing from the spirit of the invention or exceeding the scope of the appended claims.

What I claim is:

1. Apparatus of the character described, including a standard projector, for projecting stereoscopic moving pictures upon a screen, comprising a main film upon which are reproduced stereoscopic alternate right and left images, and a pilot film having alternate frames treated to polarize the light in opposite senses associated with the main film and adapted to move through the projector simultaneously with said main film whereby to polarize the light beam passing through alternate frames of the main film for projection on the screen, said projected beam being blocked alternately from the viewer's right and left eyes, when viewed through glasses having right and left lenses treated so as to polarize light in opposite senses.

2. Apparatus of the character described, including a standard projector, comprising a main film upon which are reproduced stereoscopic alternate right and left images, and a pilot film associated with the main film and adapted to move through the projector simultaneously with the main film, said pilot film having alternate frames treated to polarize light in opposite senses whereby to polarize the light beam passing through alternate frames of the main film for projection on the screen, said projected beam being blocked alternately from the viewer's right and left eyes, when viewed through glasses having right and left lenses treated so as to polarize light in opposite senses.

3. Apparatus of the character described, including a standard projector, for projecting stereoscopic moving pictures upon a screen, comprising a main film upon which are reproduced stereoscopic alternate right and left images, and a pilot film associated with the main film adapted to move through the projector simultaneously with the main film, said pilot film being in the form of an endless loop having alternate frames treated to polarize light in opposite senses, whereby to polarize the light beam passing through alternate frames of the main film for projection on the screen, said projected beam being blocked alternately from the viewer's right and left eyes, when viewed through glasses having right and left lenses treated so as to polarize light in opposite senses.

4. Apparatus of the character described, including a standard projector, for projecting stereoscopic moving pictures upon a screen, comprising a main film upon which are reproduced stereoscopic alternate right and left images, a pilot film having alternate frames treated to polarize light in opposite senses associated with main film and adapted to move through the projector simultaneously with said main film and polarize the light beam passing through alternate frames of the main film for projection on the screen, said projected beam being blocked alternately from the viewer's right and left eyes, when viewed through glasses having right and left lenses treated so as to polarize light in opposite senses, and means for feeding said pilot film simultaneously and at equal speed with main film, said pilot film having a clear untreated portion parallel to one edge.

5. Apparatus of the character described, including a standard projector, for projecting stereoscopic moving pictures upon a screen, comprising a main film upon which are reproduced stereoscopic alternate right and left images, a pilot film associated with the main film and adapted to move through the projector simultaneously with the main film, said pilot film having alternate frames treated to polarize light in opposite senses, whereby to polarize the light beam passing through alternate frames of the main film for projection on the screen, said projected beam being blocked alternately from the viewer's right and left eyes, when viewed through glasses having right and left lenses treated so as to polarize light in opposite senses, and means for feeding said pilot film simultaneously and at equal speed with main film, said pilot film having a clear untreated portion parallel to one edge.

GUILLERMO PASTOR.

REFERENCES CITED

The following references are of record in the file of this patent:

UNITED STATES PATENTS

| Number | Name | Date |
|---|---|---|
| 1,765,944 | Seel | June 24, 1930 |
| 1,787,824 | Jones | Jan. 6, 1931 |
| 1,787,825 | Jones | Jan. 6, 1931 |
| 1,788,010 | Bishop | Jan. 6, 1931 |
| 1,912,758 | Capstaff | June 6, 1933 |
| 1,984,532 | Kitroser | Dec. 18, 1934 |
| 2,203,687 | Land et al. | June 11, 1940 |
| 2,289,714 | Land | July 14, 1942 |
| 2,348,410 | Pastor | May 9, 1944 |
| 2,415,550 | Yarosh | Feb. 11, 1947 |

FOREIGN PATENTS

| Number | Country | Date |
|---|---|---|
| 555,670 | Great Britain | Sept. 2, 1943 |